United States Patent [19]

Jacoby et al.

[11] 4,202,862

[45] May 13, 1980

[54] REMOVAL OF 3-MERCAPTO-4-METHYL-2-PENTANONE FROM ZIRCONIUM/HAFNIUM SEPARATION PROCESSES

[75] Inventors: Lawrence J. Jacoby, Albany; Richard A. Rosenau, Salem; Dorothy P. Carter; Ralph H. Nielsen, both of Albany; Kenneth C. Ash, Corvallis, all of Oreg.

[73] Assignee: Teledyne Industries, Inc., Los Angeles, Calif.

[21] Appl. No.: 937,446

[22] Filed: Aug. 28, 1978

[51] Int. Cl.² .................... C01G 25/00; C01G 27/00
[52] U.S. Cl. ........................................ 423/70; 423/73; 423/658.5; 75/101 BE
[58] Field of Search ................ 423/70, 73, 658.5; 75/101 BE

[56] References Cited

U.S. PATENT DOCUMENTS

| | | | |
|---|---|---|---|
| 2,938,769 | 5/1960 | Overholsen et al. | 423/70 |
| 3,006,719 | 10/1961 | Miller | 423/70 |
| 3,069,232 | 12/1962 | Greenberg et al. | 423/70 |

FOREIGN PATENT DOCUMENTS 954251  4/1964  United Kingdom ............... 423/70

OTHER PUBLICATIONS

Stickney, "Bureau of Mines, RI 5499," 1959, Dept of Interior, Wash., D. C. 22 pp.

*Primary Examiner*—Herbert T. Carter
*Attorney, Agent, or Firm*—Shoemaker & Mattare, Ltd.

[57] ABSTRACT

A method of essentially preventing the formation of 3-mercapto-4-methyl-2-pentanone by selectively controlling an ammonium thiocyanate-methyl isobutyl ketone regeneration system by maintaining the pH in the range of 4 to 9, and the temperature below 150° F.

4 Claims, No Drawings

REMOVAL OF 3-MERCAPTO-4-METHYL-2-PENTANONE FROM ZIRCONIUM/HAFNIUM SEPARATION PROCESSES

BACKGROUND OF THE INVENTION

1. Field of the Invention:

This invention relates to a method of essentially preventing the formation of 3-mercapto-4-methyl-2-pentanone by controlling an ammonium thiocyanate-methyl isobutyl ketone regeneration process. 3-Mercapto-4-methyl-2-pentanone is an offensive compound which can be normally produced in the zirconium/hafnium separation process if the ketone regeneration process is not carefully controlled.

2. Description of the Prior Art:

In view of the recent emphasis placed on environmental control and pollution, it has become increasingly important to reduce all forms of offensive effluents from chemical processing plants. In the separation of hafnium from zirconium, ammonium thiocyanate is used as a complexing agent for the liquid-liquid extraction process. During various steps of the operation, the thiocyanate can enter into side reactions, which can produce offensive sulphur containing compounds. Large expenditures have been set forth to determine what these compounds are and how to remove them or prevent their production. Until the present, these procedures have not been fully successful, mostly due to the difficulty in determining the precise identity of these compounds, and in the difficulty in removing these compounds from the effluent to a degree where they are not detectable by humans. Instruments for detecting the presence of these compounds are extremely precise and refined; however, they have still not reached the sensitivity of the human nose, which can pick up such minute amounts of 3-mercapto-4-methyl-2-pentanone as one part in 10 billion.

In view of this fact, it has become increasingly important to determine exactly what the offensive compound is and to find a way to prevent its formation, rather than remove the compound, since detection of the efficiency of removal is not sophisticated enough.

BRIEF SUMMARY OF THE INVENTION

1. Objects of the Invention:

It is, accordingly, one object of the present invention to set forth a process whereby offensive effluents are almost completely prevented from forming.

An additional object of the present invention is to set forth a process whereby 3-mercapto-4-methyl-2-pentanone is prevented from being produced by an ammonium thiocyanate-methyl isobutyl ketone regeneration process.

Another object of the present invention is to prevent the formation of 3-mercapto-4-methyl-2-pentanone by an ammonium thiocyanate-methyl isobutyl ketone regeneration process by maintaining the pH between 4 and 9, and the temperature below 150° F.

A still further object of the present invention is to prevent the formation of 3-mercapto-4-methyl-2-pentanone by an ammonium thiocyanate-methyl isobutyl ketone regeneration process by maintaining the temperature below 150° F. by recycling part of the cooled aqueous mixture from the neutralization reaction back through the reaction mixer so that the high instantaneous heat release created by the neutralization of a strong acid by a strong base will be absorbed by the larger mass of incoming liquid, thereby limiting the peak temperature.

Yet a further object of the present invention is to prevent the formation of 3-mercapto-4-methyl-2-pentanone by an ammonium thiocyanate-methyl isobutyl ketone regeneration process by maintaining the temperature below 150° F. by several heat exchangers coupled with a recycle step.

These and other objects of the present invention will become apparent from the following detailed description and examples.

In accordance with the above objects, it has been found that 3-mercapto-4-methyl-2-pentanone formation can be essentially stopped in an ammonium thiocyanate-methyl isobutyl ketone regeneration process by maintaining a temperature below 150° F., and the pH between 4 and 9. The pH is controlled by the amount of reactants added to the process, and the temperature is maintained by one or more heat exchangers coupled with recycling the neutralized mixture with the incoming solution to be treated. The neutralized mixture will absorb much of the heat of the neutralization reaction, and prevent high temperatures from occurring. It is also possible to have more than one heat exchanger and perform the neutralization in steps so that the temperature throughout the neutralization process can be incrementally decreased along the reaction line.

DESCRIPTION OF THE PREFERRED EMBODIMENTS

In accordance with the present invention, it has been found that 3-mercapto-4-methyl-2-pentanone is the offensive effluent from the zirconium-hafnium separation process. This is contrary to what was previously thought to be the sulphur containing compound. The zirconium/hafnium separation process referred to herein is exemplified in "Zirconium-Hafnium Separation", U.S. Bureau of Mines Report of Investigation 5499, 1959, and "Separation of Hafnium from Zirconium", U.S. Pat. No. 2,938,769, May 31, 1960. Knowing this compound, it has been determined that its production can be effectively prevented by maintaining the ammonium thiocyanate-methyl isobutyl ketone regeneration process below a certain temperature and within a pH range. This compound, it has been found, will not form below 150° F. and within a pH of 4 to 9, preferably 7.5. It has further been determined that the process is capable of running with full efficiency at this pH, and that the temperature can be controlled by using one or more heat exchangers and a recycle system to remove the heat of the reaction from the neutralization process. The recycling allows the heat of reaction to be absorbed by the recycled neutralized solution, thus maintaining the temperature below 150° F. It is also possible to reduce the temperature by performing the neutralization reaction in steps with a heat exchanger between each step. An example illustrating how these two parameters, temperature and pH, are maintained is set forth below to illustrate the process of the invention.

In the preferred version of the process, 1700 to 2600 gallons per hour or regenerated ammonium thiocyanate solution are recycled to the input where it is mixed with 210 gallons per hour of aqua ammonia and 60 gallons of wash water from the secondary countercurrent wash system and anhydrous ammonia as needed to control pH. This total solution is then mixed with 1700 gallons per hour of the methyl isobutyl ketone-thiocyanic acid solution, whereupon the ketone-soluble thiocyanic acid is neutralized by the ammonium hydroxide to form water-soluble ammonium thiocyanate, and the resulting solutions are promptly conducted into a water cooled heat exchanger. The cooled, mixed solutions then go into a mixer settler to allow the liquid phases to separate. The methyl isobutyl ketone phase goes into secondary counter-current washing system. The aqueous ammonium thiocyanate phase is split with part returning as recycle and the rest going to the product tank.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the mete and bounds of the claims or that form their functional as well as conjointly cooperative equivalent are, therefore, intended to be embraced by those claims.

We claim:

1. In a methyl isobutyl ketone liquid-liquid extraction method for separating zirconium from hafnium wherein ammonium thiocyanate is used as a complexing agent and wherein 3-mercapto-4-methyl-2-pentanone is formed in the ammonium thiocyanate-methyl isobutyl ketone regeneration process the improvement comprising preventing the formation of 3-mercapto-4-methyl-2-pentanone in said regeneration process comprising maintaining a pH of from 4 to 9 and a temperature below 150° F.

2. The method of claim 1 wherein the pH is maintained at about 7.5.

3. The method of claim 1 wherein the temperature is maintained below 150° F. by recycling cooled regenerated ammonium thiocyanate solution in the ammonium thiocyanate-methyl isobutyl ketone regeneration process.

4. The method of claim 1 wherein the temperature is maintained below 150° F. by adding a thiocyanic acid-methyl isobutyl ketone solution to be regenerated to the ammonia-containing solution sequentially and cooling between each addition.

* * * * *